United States Patent

Pullukat

[11] 4,031,298
[45] June 21, 1977

[54] POLYMERIZATION CATALYST AND METHOD

[75] Inventor: Thomas J. Pullukat, Hoffman Estates, Ill.

[73] Assignee: Chemplex Company, Rolling Meadows, Ill.

[22] Filed: June 30, 1975

[21] Appl. No.: 591,942

[52] U.S. Cl. .............................. 526/113; 526/106; 252/428; 252/430; 252/458; 252/465

[51] Int. Cl.² ...................... C08F 4/02; C08F 4/78; C08F 10/00

[58] Field of Search .............. 260/94.9 D, 94.9 DA, 260/93.7; 252/428, 430, 458, 465; 526/106, 113

[56] References Cited

UNITED STATES PATENTS

| | | | |
|---|---|---|---|
| 3,324,101 | 6/1967 | Baker et al. | 260/94.9 DA |
| 3,625,864 | 12/1971 | Horvath | 260/94.9 D |
| 3,676,417 | 7/1972 | Horvath | 260/94.9 D |
| 3,704,287 | 11/1972 | Johnson | 260/94.9 DA |
| 3,780,011 | 12/1973 | Pullukat et al. | 260/94.9 D |
| 3,876,554 | 4/1975 | Pullukat | 260/94.9 D |
| 3,879,362 | 4/1975 | Chalfont et al. | 252/428 |
| 3,884,832 | 5/1975 | Pullukat et al. | 260/94.9 D |
| 3,887,494 | 6/1975 | Dietz | 252/458 |

*Primary Examiner*—Alan Holler
*Attorney, Agent, or Firm*—Wegner, Stellman, McCord, Wiles & Wood

[57] ABSTRACT

A catalyst system for the polymerization of at least one 1-olefin to produce a polymer of ultralow molecular weight (ULMW) and prepared by (1) forming a substantially dry intimate mixture of an alkyl ester of titanium containing about 1–7 carbon atoms in the alkyl group and a support of the class consisting of finely divided silica, alumina, zirconia, thoria and mixtures thereof, (2) calcining said ester-support mixture to and at a temperature between about 400°–1000° C., (3) adding to the resulting calcined mixture an organotin chromate essentially of the formula

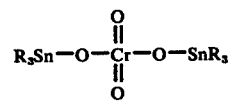

wherein each R is an individually selected hydrocarbon radical containing from 1–14 carbon atoms, and (4) activating the resulting coated calcined mixture by heating to and at a temperature between about 300°–500° C. in the presence of oxygen.

The disclosure also includes the method of making the catalyst system and the method of making polymers of ultralow molecular weight from polymerizable 1-olefins by polymerizing at least one 1-olefin under polymerizing conditions with the catalyst system disclosed herein.

19 Claims, No Drawings

POLYMERIZATION CATALYST AND METHOD

BACKGROUND OF THE INVENTION

It is well known that 1-olefins can be polymerized either alone or in combinations of two or more with catalysts containing chromium compounds. The oldest and probably the most well known is the Phillips catalyst made by extending a water soluble chromium compound like chromium trioxide, ammonium chromate, etc. onto an inorganic oxide support like silica, alumina, zirconia, thoria, etc. In U.S. Pat. No. 3,780,011, assigned to the assignee hereof, there is described a catalyst containing titanium on chromium trioxide-silica which gives higher activity, higher melt index and higher HLMI/MI for the polymer and also no induction time in ethylene polymerization as contrasted to the conventional Phillips catalyst. Recently Union Carbide Corp. obtained U.S. Pat. Nos. 3,806,500; 3,844,975; 3,709,853; 3,756,998; 3,324,101; 3,642,749; 3,836,595; 3,687,920, etc. in which chromium compounds like organosilyl chromate, pi-bonded allyl chromium, cyclopentadienyl chromium, etc. when extended onto inorganic supports like silica showed catalytic activity for ethylene polymerization.

In U.S. Pat. Nos. 3,884,832 and 3,941,761, both assigned to the assignee hereof, there is described a novel catalyst system and method for the polymerization of olefins. An organotin chromate compound when supported on silica or the like modified with the metals titanium, zirconium, etc. and with an alkyl aluminum compound gave a highly active ethylene polymerization catalyst. The polymers produced are ultra high molecular weight and are useful in forming very tough and abrasion resistant articles like gears, coal mine chutes, etc.

SUMMARY OF THE INVENTION

The new catalyst of this invention is based on organotin chromate which can be used to produce ultralow molecular weight polyolefins. In high speed cast film, blow molding and injection molding applications, it is desirable to have low molecular weight thermoplastic polymers. Currently, low molecular weight polyethylene is manufactured by the solution processes which are generally not economical. The catalysts of this invention, on the other hand, which omit the alkyl aluminum compound now make it possible to produce polyethylene of very low molecular weight or high melt index (ASTM D-1238) in the particle form process which is much more economical and otherwise more satisfactory. The polyethylene, for example, formed has an exceptionally broad molecular weight distribution and the particles are extremely fine with a weight average particle diameter of about 14 microns. Conventional particle form polyethylene has an average particle diameter of about 500 microns. This type of fine polyethylene particles is useful in specialized coating applications and can command a premium price.

DESCRIPTION OF THE PREFERRED EMBODIMENT

In my prior U.S. Pat. No. 3,876,554, assigned to the assignee hereof and herein incorporated by reference, there is described and claimed a new process and a new catalyst system for olefin polymerization based on a new and different class of catalytic compounds, hereinafter called tinchromates characterized by the formula:

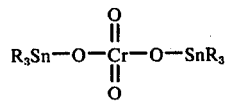

wherein R is a hydrocarbon group of from 1 to about 14 carbon atoms, in combination with alkyl aluminum compounds. These catalysts can be used in solution in an inert hydrocarbon or they may be supported on an inert high surface area solid support such as silica, alumina, zirconia, thoria or mixtures thereof.

The catalysts of this invention may be made by treating silica, for example, which has been dried at an elevated temperature such as 100°–200° C. with an ester of titanium in an amount, for example, to give approximately 5% titanium on the silica followed by calcining this mixture preferably in a fluidized bed with air at an elevated temperature of, for example, about 800° C. The calcining causes an interaction between the support and the titanium ester so that volatile reaction products are expelled and the silica and titanium are combined. Then, the calcined product is mixed with an organotin chromate such as in solution form in a solvent and the resulting catalyst combination freed of solvent in a process step which includes heating the product in air at an elevated temperature of, for example, about 400° C.

Silica, for example commerically available Davison Chemical Co. grade 952, can be used. This is dried in a fluidized bed. The dry silica was treated with a titanium ester, for example, tetraisopropyl titanate. This treatment can be effected in a fluidized bed by adding the titanium ester as a liquid or as a vapor or by a solution impregnation technique. Fluidized bed addition is more convenient and more economical. The amount of titanium ester used is calculated to give 1–10% titanium on the final catalyst and a titanium level of 3–5% is a desirable level. The titanium ester treated silica is then calcined in a fluidized bed at 400°–1000° C. The preferred range is between about 600°–800° C.

Silica which has been treated with titanium ester and calcined at any temperature between 400°–1000° C. is then coated with an organotin chromate. Examples of organotin chromates are bis (triphenyltin)chromate, bis(trimethyltin)chromate, bis(tributyltin) chromate, etc. and such coatings can be done by a solution impregnation technique. Good solvents are methylene chloride, benzene toluene, chloroform, etc. The final chromium level on silica can be between 0.1–10%. Too small or too high a level is not preferred and 0.5–2% chromium level is preferred from a practical standpoint. The solvent is then removed by any conventional technique such as fluid bed drying, vacuum drying, etc.

The silica-titanium combination containing the organotin chromate is then activated in a fluidized bed with air between 300°–500° C. Lower temperatures give low activity and higher temperatures are inconvenient and also they gave catalysts which produce high molecular weight polyethylene.

The modifying esters are alkyl esters of titanium containing 1 to about 7 carbon atoms in the alkyl group and are substantially free of non-aqueous solvents. The adding of the ester to the support is preferably accomplished while fluidizing the finely divided support at an elevated temperature with a substantially dry gas that is substantially inert to the support bed and to the ester. It can also be accomplished by using a substantially non-aqueous solvent solution addition of the ester. The ester is added in an amount to give about 1–10% of the titanium in the final catalyst. The volatile constituents of the treated support are then driven off as during calcining at a temperature of about 400°–1000° C. while fluidizing.

The tinchromates employed herein are characterized by having the formula:

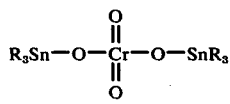

wherein each R is an individually selected hydrocarbon group or radical having from 1 to about 14 carbon atoms, preferably from about 3 to about 10 carbon atoms. Illustrative thereof are methyl, ethyl, propyl, isopropyl, n-butyl, iso-butyl, n-pentyl, iso-pentyl, t-pentyl, hexyl, 2-methyl-pentyl, heptyl, octyl, 2-ethylhexyl, nonyl, decyl, hendecyl, dodecyl, tridecyl, tetradecyl, benzyl, phenethyl, p-methyl-benzyl, phenyl, tolyl, xylyl, naphthyl, ethylphenyl, methylnaphthyl, dimethylnaphthyl and the like. Illustrative of the preferred tinchromates (but by no means exhaustive or complete of those which can be employed in this process) are the compounds:

Bis-trimethyltinchromate
Bis-triethyltinchromate
Bis-tributyltinchromate
Bis-triisopentyltinchromate
Bis-tri-2-ethylhexyltinchromate
Bis-tridecyltinchromate
Bis-tri(tetradecyl)tinchromate
Bis-tribenzyltinchromate
Bis-triphenethyltinchromate
Bis-triphenyltinchromate
Bis-tritolyltinchromate
Bis-trixylyltinchromate
Bis-trinaphthyltinchromate
Bis-triethylphenyltinchromate
Bis-trimethylnaphthyltinchromate
polydiphenyltinchromate
Polydiethyltinchromate, and the like While both the aryl- and alkylsubstituted tinchromates can be used, it is to be noted that the aryl-tinchromates are more active and are easier to prepare.

It is highly advantageous that the support be finely divided, considering the desirability or possibility of later separation by filtration or other catalyst removal steps, if desired. Preferably, porous supports having large surface areas for the adsorption and/or deposition of the tinchromates such as in the order of 50 to 1000 square meters or more per gram are employed. This provides for greater ease of contact of the olefin monomer with the catalyst. Particle size of porous supports is not critical in this invention but can provide economic and materials handling benefits, depending upon the recovery techniques employed.

In this embodiment of the invention it is highly desirable that the inert support be completely dried and freed of moisture and extraneous liquids before being contacted with the titanium ester. This is normally provided by a simple heating or pre-drying of the catalyst support with an inert gas prior to use herein.

The volatile constituents of the titanium treated support are preferably driven off at this point such as during the calcining. Calcination of the treated support can be accomplished at nearly any temperature up to about its sintering temperature for a period of time at least sufficient to remove the volatiles. Desirably, an air stream through the support during the calcination aids in obtaining a desirable product. Temperatures of from about 400° C. to 1000° C. for a short period of about 2 hours or so should be sufficient if a well dried gas such as air is used. The preferred temperature range is from 600° C. through 800° C.

Any grade of support can be used herein but the microspheroidal intermediate density (MSID) silica is preferred. This grade has a surface area of 258 square meters per gram and a pore diameter of about 288 A., although the intermediate density (ID) silica having the same area but a pore diameter of 164 A. is just as satisfactory. Other grades such as the G-968 silica and G-966 silica-alumina, as designated by W. R. Grace Co., having surface areas of 700 and 500 square meters per gram, respectively, and pore diameters of 50–70 A. are also quite satisfactory. Variations in molecular weight control and in polymer productivity can be expected between different grades of supports.

The concentration of the catalyst in the polymerization reaction can be varied from about 10 to about 25,000 parts per million based on the amount of olefin monomer charged but preferably the concentration is kept below about 500 parts per million.

The olefins that are polymerized with the catalyst system of this invention have from 2 to 8 carbon atoms and are 1-olefins and include ethylene, propylene, 1-butene, 1-pentene, 1-hexene, 4-methyl-1-pentene, 1-octene, butadiene, isoprene piperylene, 1,3-octadiene, etc. Copolymers of two or more monomers can also be prepared according to this invention.

The polymerization reaction is carried out at temperatures of from about 30° C. or less up to about 200° C. or more, depending to a great extent on the operation pressure, olefin monomer, the particular catalyst and its concentration. Naturally, the selected operating temperature is also dependent upon the desired polymer molecular weight since temperature is definitely a factor in adjusting the molecular weight of the polymer. Preferably the temperature is from about 30° C. to about 110° C. in the slurry of "particle forming" technique and from 100° C. to 200° C. in "solution forming". The control of temperature in this process is desirable as hereinafter more fully described in providing various effects upon molecular weight of the polymers as well as in controlling the phase in which they are made. As with most catalyst systems, the high temperatures produce the lower weight average molecular weight polymers and consequently are of high melt index.

Regardless of whether the "particle forming" low temperatures or "solution forming" high temperatures are employed, a unique faculty of this catalyst system is the ability to carry out the polymerization to very high polymer solids, substantially higher than obtainable with any other catalyst system without fouling of the equipment.

The pressure can be any pressure sufficient to initiate the polymerization of the monomer to high polymer and can be carried out from subatmospheric pressure, using an inert gas as diluent, to superatmospheric pressure. The preferred pressure is from atmospheric up to about 1000 psig.

The inert organic solvent medium when employed in this invention is not narrowly critical but it should be inert to the catalyst and olefin polymer produced and stable at the reaction temperature used. It is not necessary, however, that the inert organic solvent medium serve also as a solvent for the catalyst composition or for the polymer produced. Among the inert organic solvents applicable for such purpose may be mentioned saturated aliphatic hydrocarbons such as hexane, heptane, pentane, isooctane, isobutane, purified kerosene and the like; saturated cycloaliphatic hydrocarbons such as cyclohexane, cyclopentane, dimethylcyclopentane and methyl-cyclohexane and the like; aromatic hydrocarbons such as benzene, toluene, xylene and the like; and chlorinated hydrocarbons such as chlorobenzene, tetrachloroethylene, orthodichlorobenzene and the like.

When it is desired to conduct the polymerization to a high solids level as hereinbefore set forth, it is of course desirable that the solvent be liquid at the reaction temperature. For example, operating at a temperature less than the solution temperature of the polymer in the solvent, the process can be essentially a slurry or suspension polymerization process in which the polymer actually precipitates out of the liquid reaction medium and in which the catalyst is dissolved or suspended as a finely divided mass of itself or on an insoluble support as hereinbefore set forth.

Catalysts so prepared can be used in particle form polymerization of ethylene using a diluent such as isobutane, pentane, etc. The polyethylenes produced have extra low molecular weight or high melt index. The particles produced in the particle form process are extremely fine and are useful in specialized coating applications. The polymer also has an exceptionally broad molecular weight distribution as shown by gel permeation chromatography that is more than conventional particle form polyethylene or other titanium modified chromium oxide catalyst. This indicates a broad spectrum of active sites in the catalyst of this invention. Without being bound by any theory expressed herein, I postulate that it is possible that the reason for this broad molecular weight distribution is the presence of different types of chromium active sites in which chromium is surrounded by titanium, tin, silica or combinations. The conventional catalyst commonly used contains only silica in combination with chromium. The following examples illustrate the principles of this invention.

All percentages herein are by weight.

EXAMPLES 1-2

8 grams of Davison Chemical Company grade 952 silica was dried at 150° C. by fluidizing in a flow of 300 cc/min nitrogen in a quartz tube with a fritted disc. Isopropyl titanate (2.5 cc) was added as a liquid to give 5% titanium on the catalyst. The mixture was then heated under nitrogen to 800° C. and then cooled to 120° C. Nitrogen was switched off and air was turned on. A 40 cc solution of 1.25 grams bis(triphenyltin)-chromate in benzene was added to the fluidized bed. The solvent was driven off by the air. The calculated chromium content was 1%. The resultant combination was then heated in air at 430° C. This catalyst was used in ethylene polymerizations. The batch reactor had a capacity of 1300 ml and the solvent used was isobutane. The total pressure was 550 psi.

| Example | Reaction Temp (° C.) | Productivity | MI |
|---------|----------------------|--------------|-------|
| 1 | 99 | 4526 | 5.48 |
| 2 | 108 | 1645 | 37.00 |

EXAMPLE 3

The catalyst was prepared as in Examples 1–2 except the chromium content was only 0.46%.

| Example | Reaction Temp (° C.) | Productivity | MI |
|---------|----------------------|--------------|-----|
| 3 | 107 | 1137 | 9.6 |

EXAMPLE 4

This example shows the effect of zirconium. Davison grade 952 silica was treated with zirconium tetrachloride to give 5% zirconium on the final catalyst. it was heated in a fluidized bed to 800° C. and cooled to 120° C. The calcined base was treated with a solution of 1.25 grams of bis(triphenyltin)chromate in 40 ml of benzene. The benzene was then driven off. The mixture was heated in air using the fluidized bed at 435° C. This catalyst was used in ethylene polymerization. The polymer produced was similar to conventional polyethylene.

| Example | Reaction Temp (° C.) | Productivity | MI |
|---------|----------------------|--------------|------|
| 4 | 99 | 1629 | 0.09 |

EXAMPLES 5-6

A pilot plant scale experiment was conducted. A silica base containing 3.6% titanium was made as described above. Bis (triphenyltin)chromate was deposited onto this silica containing titanium by solution impregnation technique. This mixture was heated in air at 425° C. This catalyst was then tested in continuous particle form loop reactor of 90 gallon capacity. Polyethylene of high melt index was obtained.

| Example | Reactivity Temp (° C.) | Ash% | MI | Rd* |
|---------|------------------------|------|-----|-----|
| 5 | 107 | .062 | 12 | 15 |
| 6 | 105 | .025 | 3.8 | 13 |

*Rd is a shear sensitivity index. A higher numberindicates higher shear sensitivity. Conventionalpolyethylene has a shear sensitivity of about 6–8Rd.

The polymer made by this particle form process had an average particle diameter of about 14 microns.

Having described my invention as related to the embodiment set out herein, it is my intention that the invention be not limited by any of the details of description, unless otherwise specified, but rather be construed broadly within its spirit and scope as set out in the appended claims.

We claim:

1. A catalyst for polymerizing one or more 1-olefins to an ultralow molecular weight and exceptionally broad molecular weight distribution, prepared by (1) forming a substantially dry intimate mixture of a finely divided support selected from the group consisting of silica, alumina, zirconia, thoria and mixtures thereof and an alkyl ester of titanium containing about 1–7 carbon atoms in the alkyl group in an amount to give about 1–10% of titanium on said support, (2) calcining said mixture from (1) to and at a temperature between about 400°–1000° C., (3) adding to the resulting calcined mixture from (2) an organotinchromate essentially of the formula

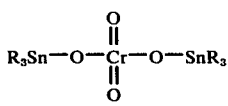

wherein each R is an individually selected hydrocarbon radical containing from 1–14 carbon atoms in an amount to give about 0.1–10% chromium in the final catalyst, and (4) activating the product from (3) by heating to and at a temperature between about 300°–500° C. in the presence of oxygen.

2. The catalyst of claim 1 wherein said support is predried for step (1) at a temperature between about 100°–200° C.

3. The catalyst of claim 1 wherein said mixture of step (1) is formed in a fluidized bed.

4. The catalyst of claim 1 wherein said adding of said organotin chromate in step (3) is in the form of a solution in a volatile solvent for said chromate followed by removal of said solvent prior to step (4).

5. The catalyst of claim 1 wherein said activating is in a fluid bed with air.

6. The catalyst of claim 1 wherein said support comprises silica.

7. The method of making a catalyst for polymerizing one or more 1-olefins to an ultralow molecular weight and exceptionally broad molecular weight distribution, prepared by (1) forming a substantially dry intimate mixture of a finely divided support selected from the group consisting of silica, alumina, zirconia, thoria and mixtures thereof and an alkyl ester of titanium containing about 1–7 carbon atoms in the alkyl group in an amount to give about 1–10% of titanium on said support, (2) calcining said mixture from (1) to and at a temperature between about 400°–1000° C., (3) adding to the resulting calcined mixtured from (2) an organotinchromate essentially of the formula

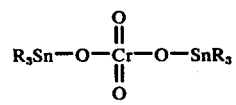

wherein each R is an individually selected hydrocarbon radical containing from 1–14 carbon atoms in an amount to give about 0.1–10% chromium in the final catalyst, and (4) activating the product from (3) by heating to and at a temperature between about 300°–500° C. in the presence of oxygen.

8. The method of claim 7 wherein said support is predried for step (1) at a temperature between about 100°–200° C.

9. The method of claim 7 wherein said mixture of step (1) is formed in a fluidized bed.

10. The method of claim 7 wherein said adding of said organotin chromate in step (3) is in the form of a solution in a volatile solvent for said chromate followed by removal of said solvent prior to step (4).

11. The method of claim 7 wherein said activating is in a fluid bed with air.

12. The method of claim 7 wherein said support comprises silica.

13. The method of making polymers of ultralow molecular weight and exceptionally broad molecular weight distribution from one or more polymerizable 1-olefins which comprises polymerizing said one or more polymerizable 1-olefins under polymerizing conditions with a catalyst prepared by (1) forming a substantially dry intimate mixture of a finely divided support selected from the group consisting of silica, alumina, zirconia, thoria and mixtures thereof and an alkyl ester of titanium containing about 1–7 carbon atoms in the alkyl group in an amount to give about 1–10% titanium on said support, (2) calcining said mixture from (1) to and at a temperature between about 400°–1000° C., (3) adding to the resulting calcined mixture from (2) an organotinchromate essentially of the formula

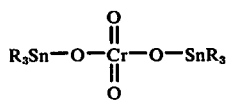

wherein each R is an individually selected hydrocarbon radical containing from 1–14 carbon atoms in an amount to give about 0.1–10% chromium in the final catalyst, and (4) activating the product from (3) by heating to and at a temperature between about 300°–500° C.in the presence of oxygen.

14. The method of claim 13 wherein said support is predried for step (1) at a temperature between about 100°–200° C.

15. The method of claim 13 wherein said mixture of step (1) is formed in a fluidized bed.

16. The method of claim 13 wherein said adding of said organotin chromate in step (3) is in the form of a solution in a volatile solvent for said chromate followed by removal of said solvent prior to step (4).

17. The method of claim 13 wherein said activating is in a fluid bed with air.

18. The method of claim 13 wherein said support comprises silica.

19. The method of claim 13 wherein said polymerizing is in the particle form process.

* * * * *